United States Patent [19]

Yarmashev et al.

[11] Patent Number: 4,993,991
[45] Date of Patent: Feb. 19, 1991

[54] THRESHING UNIT OF AN AXIAL GRAIN COMBINE HARVESTER

[76] Inventors: Jury N. Yarmashev, I-i Krepostnoi pereulok, 34 kv. 213; Vladimir A. Zapandi, ulitsa Svobody, 24/2, kv. 37; Valentin N. Tkachev, ulitsa Svobody, 27/2, kv. I, all of Taganrog, Rostovskaya oblast; Vladimir K. Zhurkin, p/o Lugovaya, VIK, IO, kv. 54, Moskovskaya oblast, all of U.S.S.R.

[21] Appl. No.: 348,005

[22] PCT Filed: Aug. 25, 1987

[86] PCT No.: PCT/SU87/00094
§ 371 Date: Apr. 10, 1989
§ 102(e) Date: Apr. 10, 1989

[87] PCT Pub. No.: WO89/01735
PCT Pub. Date: Mar. 9, 1989

[51] Int. Cl.⁵ .............................................. A01F 12/20
[52] U.S. Cl. ........................................ 460/66; 460/67
[58] Field of Search ................................... 460/66–71; 56/14.6

[56] References Cited

U.S. PATENT DOCUMENTS

| 3,982,549 | 9/1976 | De Pauw et al. | 460/67 |
| 4,177,820 | 12/1979 | Rowland-Hill | 460/66 |
| 4,607,480 | 8/1986 | Yarmashev et al. | 460/66 |

FOREIGN PATENT DOCUMENTS

| 943016 | 4/1956 | Fed. Rep. of Germany . |
| 84358 | 5/1983 | Fed. Rep. of Germany . |
| 641914 | 1/1979 | U.S.S.R. . |
| 1130243 | 12/1984 | U.S.S.R. . |
| 1288130 | 11/1986 | U.S.S.R. . |

Primary Examiner—Thuy M. Bui
Attorney, Agent, or Firm—Fleit, Jacobson, Cohn, Price, Holman & Stern

[57] ABSTRACT

A distinguishing feature of the threshing unit resides in its concave (4) being made up of a number of independent sections (5 and 6) arranged on both sides of the threshing cylinder rotor (1) longitudinal axis. The first section (5) of the concave (4), as along the direction of the cylinder rotation, is fixed rigidly with respect to the cylinder (1), while the other section (6) is articulated with respect to the first section (5) and has a device (7) for adjusting the outlet threshing clearance.

3 Claims, 1 Drawing Sheet

THRESHING UNIT OF AN AXIAL GRAIN COMBINE HARVESTER

TECHNICAL FIELD

The present invention relates generally to farm machinery industry and more specifically to threshing units or mechanisms made use of in axial grain combine harvesters.

The present invention can find most utillity when applied for harvesting such grain crops as wheat, rye, and others, as well as cereals and seeds of legumes and grasses.

BACKGROUND OF THE INVENTION

The cylinder of a known threshing unit of an axial grain combine harvester is arranged longitudinally and performs threshing of the feed material and its translation motion over the concave surface along a helical pathway. The threshing action is effected due to combined impact and rubbing effects produced by the cylinder working members and the concave bars on the crop material being threshed.

Lighter operating duties of the thresher unit featuring the longitudinal cylinder arrangement and substitution of the rubbing action for the impact one make it possible to considerably reduce the degree of grain damage which of grain and seeds and prolonging the storage period of bread grain.

However, the threshing unit of an axial combine harvester, with longitudinally arranged cylinder, apart from the aforesaid advantages, suffer from such a characteristic disadvantage as a one-sided displacement, with respect to the harvester longitudinal axis, of the crop material that has been threshed and passed through the concave, with the result that the cleaning mechanism is charged but nonuniformly uniformly as for width. This in turn lead to grain losses in the course of cleaning and affects adversely the total throughput capacity of the combine harvester. The aforesaid disadvantage stems from the fact that the material being threshed, while running through a helical pathway over the threshing zone, is subjected to repeated effect of the cylinder working members and of the concave bars, the degree of this effect being variable and depending upon the amount of the cylinder-to-concave (or threshing) clearance. Intensity of passing the crop material through the free cross-sectional area of the concave is also variable. It is due to the amount of threshing clearance diminishing towards the exit end of the machine that the traverse speed of the material being threshed over the concave is increased. Thus, the layer of the crop material being handled is spread under the effect of centrifugal forces, which contributes to separation of the material through the concave. As a result of a relative movement of the compacting layers of the crop material in a narrowing threshing clearance and of its active interaction with the concave bars, the threshing and separation process at the concave outlet is intensified. Besides, the crop material separated through the concave by virtue of centrifugal forces, is subjected to the effect of the two differently directed forces, that is, the gravitational force and a force tangential to the traversing pathway of the material being threshed along a circle arc. Non uniformly spread crop material separated through the concave results in an inadequate loading of the cleaning mechanism riddle, which impairs the operation of this mechanism and reduces the total throughput capacity of the combine harvester. Apart from all the aforesaid, when the material being threshed is moving through the threshing clearance, the material is in a compacted state throughout the concave length, which impedes separation of the threshed crop material through the concave and affects the threshing capability of the cylinder working members.

Known in the art is an axial grain combine harvester (cf. U.S. Pat. No. 3,982,549, Cl.A01F 12/20), wherein the threshing unit comprises a rotary cylinder arranged along the direction of travel of the combine harvester and accommodated in a stationary cylindrical casing whose top portion is provided with helical guide ribs located on the casing internal surface, while the bottom portion of the casing situated in the threshing zone is provided with a change concave.

A disadvantage inherent in the aforedescribed threshing unit resides in too a low threshing capability of the concave. Due to the fact that the material being threshed is in a compacted state throughout the length of concave arc, separation of the threshed crop material through the concave is impeded and, accordingly, the threshing capability of the cylinder working members is affected adversely. Besides, throughput capacity of the threshing unit is badly affected due to too a small angle of drum-to-concave contact. Moreover, the one-sided displacement, with reference to the longitudinal axis of the cylinder, of the threshed material separated through the concave and its spreading across the width of the cleaning mechanism riddle in a layer nonuniform as for thickness, which are common to axial grain combine harvesters, affects the quality of performance of the cleaning mechanism and reduces the total throughput capacity of the harvester.

With the same longitudinally arranged threshing cylinder but with the concaves contacting the cylinder at different angles, the threshing and separating efficiency and the throughput capacity of the threshing unit is higher whenever the concave contacts the cylinder at a greater angle, while intensity of separation of the crop material through the concave and uniformity of loading of the cleaning mechanism as for width depend on the amount of the threshing clearance. However, when the angle of contact of the concave with the cylinder exceeds 120° the difference between the cylinder-to-concave clearances in the various concave positions, is increased to a greater extent, which affects the normal operating process proceeding in the threshing unit and involves the use of sectional concaves and a sophisticated mode of suspension and adjustment of such concaves.

One of the indispensable prerequisites of a quality operation of the cleaning mechanism both in a traditional and an axial combine harvester is a uniform feeding, as for thickness, of a layer of the crop material. A nonuniform, as for thickness, layer of the crop material that moves over the riddle working surface, fails to be blown through completely with an air stream established by the fan of the cleaning mechanism, whereby the unthreshed grain comes out of the combine harvester along with cavings, thus affectings its total throughput capacity.

Another prior-art axial grain combine harvester (cf. U.S. Pat. No. 4,177,820, AC1F 12/20) is known to comprise a threshing unit wherein the threshing cylinder along with a stationary cylindrical casing encompassing said cylinder from above and a change concave contacting the cylinder from below, is offset towards one of the vertical walls of the harvester hull in a direction opposite to the direction of the cylinder rotation. A guide baffle is provided on the opposite vertical wall of the harvester hull, said baffle being adjustable as for the angle of deflection. However, provision of one or a number of guide baffles (on both vertical walls), though contributing to withdrawal and concentration of the principal part of the threshing products separated through the concave close to the longitudinal axis of symmetry of the conveyer, but fails to provide adequate conditions for a uniform spreading of said products across the width of the cleaning mechanism riddle. Another disadvantage of said threshing unit resides in too a low threshing capability of the concave due to the fact that the material under threshing is in a contracted state throughout the length of the concave arc, which impedes separation of the threshed material, affects the threshing capability of the cylinder working members and, due to too a small angle of cylinder-to-caving contact, also the throughput capacity of the threshing unit.

Thus, the aforediscussed known constructions of threshing units is featured by a low threshing and separating capabilities and fail to provide adequate conditions for a uniform spreading of the crop material over the cleaning mechanism riddle as for thickness. Thus, the performance of the cleaning mechanism is affected badly, which results in unsatisfied loss of grain behind the grain harvester and in a reduced total throughput capacity thereof.

SUMMARY OF THE INVENTION

The main object of the present invention to provide a novel concave of a threshing unit construction of which would make it possible to enhance the efficiency of threshing and separation throughout the entire angle of cylinder-to-concave contact and which make it possible to provide a uniform distribution of the crop material under threshing over the whole concave area.

This object is accomplished due to the fact that in a threshing unit of an axial grain combine harvester, comprising a rotary threshing cylinder arranged along the direction of the harvester travel and accommodated in a stationary cylindrical casing whose top portion is provided with helical guide ribs located on its inner surface, while the bottom portion of the cylindrical casing situated in the threshing zone is provided with a change concave, according to the invention, the concave is made up of a number of independent sections arranged on both sides of the cylinder longitudinal axis, the first concave section, as along the direction of the cylinder rotation, is rigidly fixed with respect to the cylinder, while the second concave section is mounted articulately with respect to the first section and has a device for adjusting the threshing clearance at the outlet of the unit.

The proposed construction of the threshing unit concave, while offering a considerably increased angle of cylinder-to-concave contact, involves no complicated mode of its suspension and adjustment, renders the threshing and separation more efficient and increases the throughput capacity of the threshing unit.

According to an alternative embodiment of the invention, the first concave section, as along the direction of the cylinder rotation, is arranged stepwise with respect to the second concave section in the adjacent zone, the threshing clearance in the first section being smaller than in the second section.

Such a construction of the concave increases the threshing and separation efficiency in either of the concave sections and makes it possible to distribute the crop material separated on the concave more uniformly across the width of the cleaning mechanism riddle. In addition, the construction of the concave allows for the following factors: intensity of separation of the crop material by the concave throughout the whole angle of cylinder-to-concave angle; degree of effects produced by the cylinder working members and the concave bars on the material under threshing as a function of the threshing clearance; the effect of forces different in magnitude and direction applied to the crop material under the action of centrifugal forces; single-sided, with respect to the cylinder longitudinal axis, displacement of the crop material separated by the concave, across the width of the cleaning mechanism.

Moreover, the operation of the cleaning mechanism is stabilized and hence the total grain losses behind the harvester are reduced and, consequently, its throughput capacity is enhanced.

According to a preferred embodiment of the invention, the first concave section, as along the direction of the cylinder rotation, may be so arranged with respect to the second section in the adjacent zone that the threshing clearance should increase in a direction of the axial movement performed by the material being threshed.

Such an embodiment of the concave construction makes it possible to considerably decrease the degree of damage inflicted upon the grain, which of special importance in view of improved grain sowing qualities and prolonged storage period of bread grain.

BRIEF DESCRIPTION OF DRAWINGS

Other objects and advantages of the present invention will become more apparent from a detailed description of a specific exemplary embodiment thereof with reference to the accompanying drawings, wherein.

BEST MODE OF CARRYING OUT THE INVENTION

Figure 1:
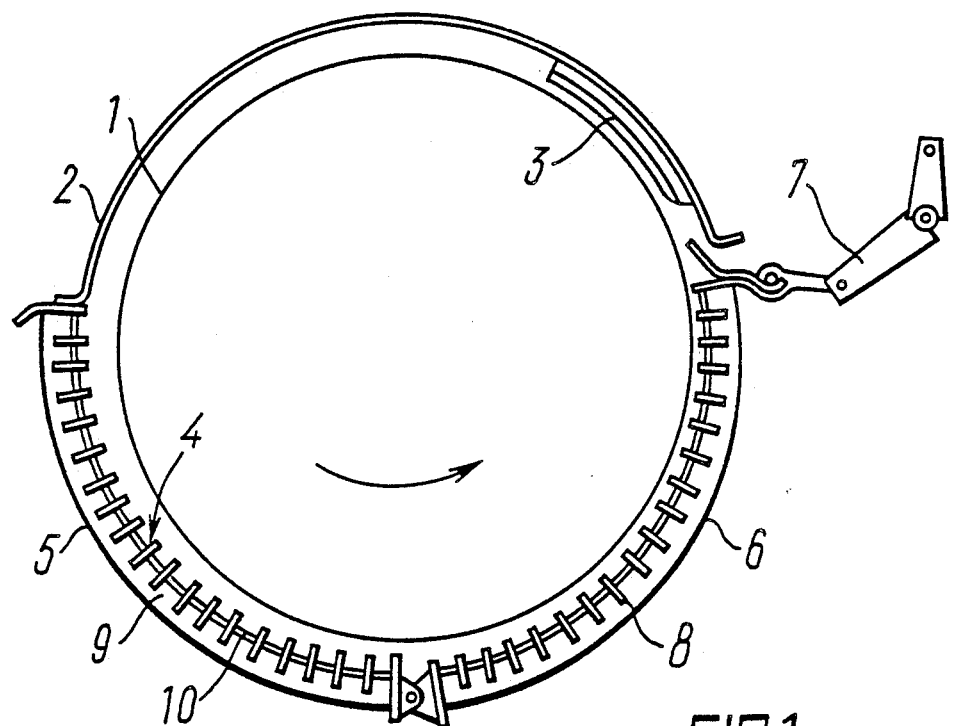
FIG. 1 is a schematic cross-sectional view of a threshing unit of an axial grain combine harvester.

Now referring to the accompanying drawings FIG. 1 represents the threshing unit of an axial grain combine harvester, said unit comprising a threshing cylinder 1 accommodated in a stationary cylindrical casing 2 whose top portion is provided with helical guide ribs 3 located on the casing inner surface, while the bottom portion of the casing 2 situated in the threshing zone, has a change concave 4 which makes up a V-shaped clearance with the cylinder 1, said clearance being arranged in the direction of the cylinder rotation.

The change concave 4 is composed of a section 5 fixed stationary with respect to the cylinder 1, and a movable section 6 articulated, with one of its ends, to the section 5 in the adjacent zone and associated, with the other end, with a device 7 for adjusting the threshing clearance at the outlet of the unit, said device being made by any known method.

When harvesting grain crops the working surface of the concave 4 has a known grate-type construction formed by a number of longitudinal bars 8 and cross bars 9, as well as fingers 10.

Then harvesting the seedballs of grasses the change concave 4 should have its working surface provided with the elements of active rubbing and separation.

The section 5 of the concave 4 may be put in the adjacent zone stepwise with respect to the section 6, and may feature the threshing clearance smaller than in the section 6.

Figure 2:
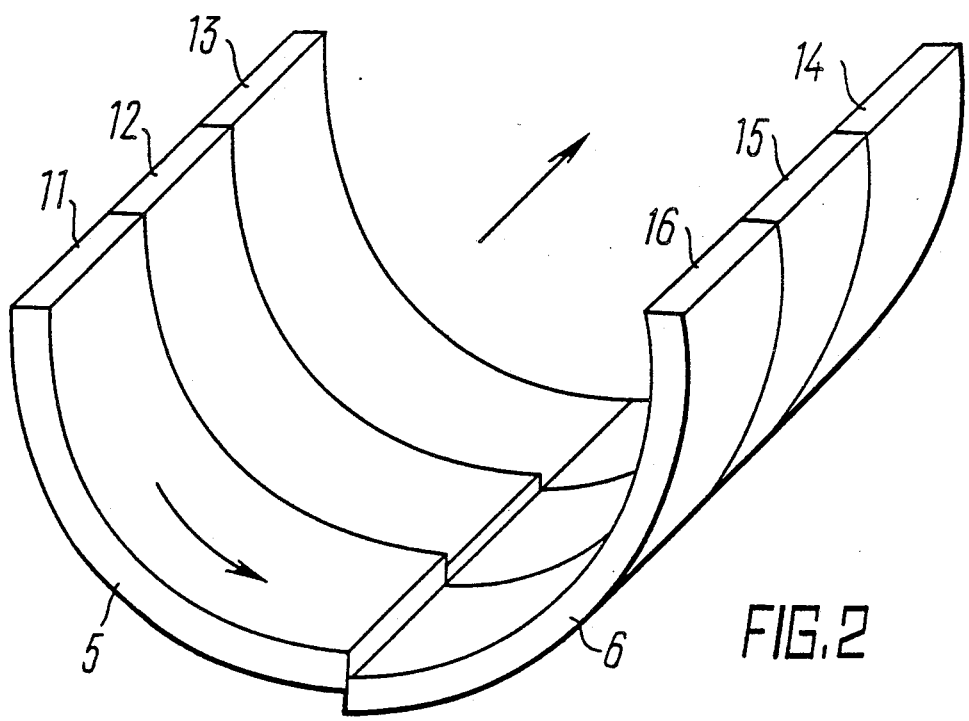
FIG. 2 is a perspective view of an alternative embodiment of the concave of the threshing unit of FIG. 1.

As can be seen from FIG. 2 the section 5 of the concave 4 is so arranged in the adjacent zone with respect to the section 6 that the threshing clearance increases in the direction of the axial travel performed by the material under threshing.

For better operating convenience involved in changing the sections of the change concave 4, the latter may be implemented as detachable sections 11 through 16 (FIG. 2) arranged also stepwise with respect to one another as the sections of the concave 4 described above.

The threshing unit of the invention operates as follows.

The crop material to be threshed fed to the threshing unit is subjected to the repeated action of the working members of the cylinder 1 and the longitudinal bars 8 of the concave 4 (FIG. 1), the degree of said action being variable and depending upon the amount of the threshing clearance left between the cylinder 1 and the sections 5 and 6 of the concave 4.

The helical guide ribs 3 of the casing 2 provide for all necessary conditions for axial and helical motion of the material in the threshing zone.

The intensity of the crop material separation by the concave 4 with respect to the longitudinal axis of the cylinder 1 is variable, i.e., it proves to be higher in a narrowing threshing clearance, this being due to an increased travelling speed of the crop material over the concave 4 towards its outlet, whereby the material is pulled apart layer-by-layer and intensely interacts with the bars 8 of the concave 4. When the material being threshed travels in the direction of a greater threshing clearance the material travelling speed on the sections 5 and 6 of the concave 4 is decelerated, the layer of the material under process gets wider and loose, its voids ratio is increased with the result that interaction of the material with the cylinder 1 leads to intense grain shaking out of the crop material, and the grain separation by the concave 4 is bettered.

Provision of the concave 4 made up of the sections 5 and 6 that define a V-shaped threshing clearance with cylinder 1 on each of the sections, which clearance is directed towards the sense of the cylinder rotation, increase the efficiency of threshing and separation on each of said sections of the concave 4 throughout the entire angle of the cylinder-to-concave contact.

It is due to an adequate account of the degree of effect produced on the material along the arc of the concave 4 on the sections 5 and 6 thereof and difference intensity of material separation through the concave that the material is spread more uniformly over the whole concave area.

More uniform loading of the cleaning mechanism riddle across its width renders the operation of the cleaning mechanism more stable, whereby grain losses are reduced and the throughput capacity of the grain harvester is increased.

INDUSTRIAL APPLICABILITY

The proposed construction of the threshing unit of an axial grain combine harvester provides for high throughput capacity of the latter, minimizes grain losses involved in the harvesting process and makes it possible to utilize the unit on large producing areas featuring diverse kinds of crops to be harvested.

We claim:

1. A threshing unit of an axial grain combine harvester comprising a rotor (1) arranged along the direction of the harvester travel and accommodated in a stationary cylindrical casing (2) whose top portion is provided with helical guide ribs (3) located on its inner surface, while the bottom portion of the cylindrical casing situated in the threshing zone is provided with a change concave (4), characterized in that the concave (4) is made up of a number of independent sections (5 and 6) arranged on both sides of the longitudinal axis of the cylinder rotor (1), the first section (5) of the concave (4) as along the direction of rotation of the cylinder rotor (1), is rigidly fixed with respect to the cylinder rotor (1), while the second concave section (6) is connected to the first section (5) by an articulated joint and has a device (7) for adjusting the threshing clearance at the outlet of the unit.

2. A threshing unit as claimed in claim 1, characterized in that the first section (5) of the concave (4), as along the direction of the cylinder rotation, is so arranged with respect to the second section (6) in the adjacent zone that the threshing clearance is increased in the direction of the axial travel of the material under threshing.

3. A threshing unit of an axial grain combine harvester comprising a rotor (1) arranged along the direction of the harvester travel and accommodated in a stationary cylindrical casing (2) whose top portion is provided with helical guide ribs (3) located on its inner surface, while the bottom portion of the cylindrical casing situated in the threshing zone is provided with a change concave (4), characterized in that the concave (4) is made up of a number of independent sections (5 and 6) arranged on both sides of the longitudinal axis of the cylinder rotor (1), and that the first section (5) of the concave (4), as along the direction of the cylinder rotation, is arranged to provide a radial step with respect to the other section (5) in the adjacent zone, the threshing clearance on the first section (5) being smaller than on the second section (6).

* * * * *